United States Patent [19]
Gallego

[11] 3,895,506
[45] July 22, 1975

[54] LOCKING CLOSURE FOR FUEL TANK

[76] Inventor: Steve F. Gallego, 125 E. 40th St., Tuscon, Ariz. 85713

[22] Filed: Apr. 19, 1974

[21] Appl. No.: 462,421

[52] U.S. Cl. ............ 70/168; 49/465; 280/152 A; 292/48; 296/1 C
[51] Int. Cl. ............................................. E05b 65/12
[58] Field of Search ......... 70/77, 163, 168; 49/465; 109/50, 58, 59; 280/152 A, 153 R; 296/1 C; 292/48

[56] References Cited
UNITED STATES PATENTS

| | | | |
|---|---|---|---|
| 1,452,471 | 4/1923 | Kline | 70/168 |
| 1,808,403 | 6/1931 | Eklund | 292/48 |
| 1,982,568 | 11/1934 | Boss | 224/42.12 |
| 2,060,416 | 11/1936 | Hersch | 70/168 |
| 2,819,692 | 1/1958 | Johnson et al. | 109/50 |

Primary Examiner—Albert G. Craig, Jr.
Attorney, Agent, or Firm—John N. Randolph

[57] ABSTRACT

A closure equipped with a key actuated lock for moving locking dogs into engagement with portions of the inner surface of a vehicle body for securing a plate of the closure in a position covering an access opening in the vehicle body, to deny access through said opening to the fuel tank filling neck and its closure cap. An extension or ear and an adjustable resilient bumper, carried by the closure plate, cooperate with the locking dogs to hold the closure immovable over the access opening, when in a locked position, and in a manner to prevent rattling.

2 Claims, 6 Drawing Figures

LOCKING CLOSURE FOR FUEL TANK

SUMMARY

It is a primary object of the present invention to provide a locking closure for the access opening of certain motor vehicles through which the fuel tank of the vehicle is refilled, so that the filling neck of the fuel tank and its closure cap is rendered inaccessible to unauthorized persons not having a key fitting the lock of the closure.

Another object of the invention is to provide such a locking closure having means to prevent rattling of the closure when in an applied and locked position.

A further object of the invention is to provide a locking device for a motor vehicle which renders a fuel tank filling neck and its closure cap completely inaccessible when in an applied position.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 1:
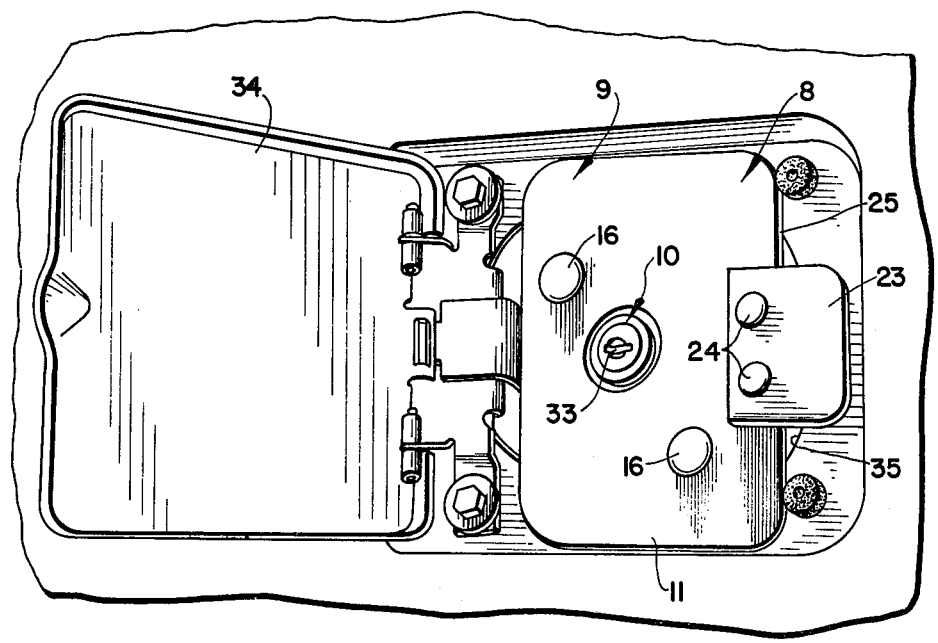
FIG. 1 is a fragmentary elevational view of a portion of a motor vehicle body showing the locking closure applied to an opening thereof.

The fuel tank locking closure in its entirety and comprising the invention is designated generally 8 and includes a locking plate 9 which supports a conventional cylinder lock 10 which extends therethrough from an upper side 11, and which is secured in an opening of the plate 9 by a nut 13 which is tightened against the underside 12 of said plate.

A bar 14 is secured intermediate of its ends immovably to the inner end of the revolving plug of the lock 10 by a screw 15. The lock 10 is interposed between nut and bolt fastenings 16 which engage through the plate 9 and which provide pivots for a pair of locking dogs 17 which are disposed on the inner side 12 of said plate and spaced therefrom by spacer elements 18 which are mounted on the bolts of the fastenings 16 between the plate 9 and dogs 17. The bolts of the fastenings 16 engage through the dogs 17 adjacent corresponding ends thereof, and nut and bolt fastenings 19 engage through the dogs 17 between said fastenings 16 and the other, free ends of the dogs. Corresponding ends of a pair of rigid links 20 are pivotally mounted on the fastenings 19 on the sides of the dogs 17 which face away from the plate 9, and are spaced from said sides by spacer elements 21, which are carried by the bolts of the fastenings 19. The other, adjacent ends of the links 20 are pivotally connected by fastenings 22 to the ends of the bar 14.

Figure 2:
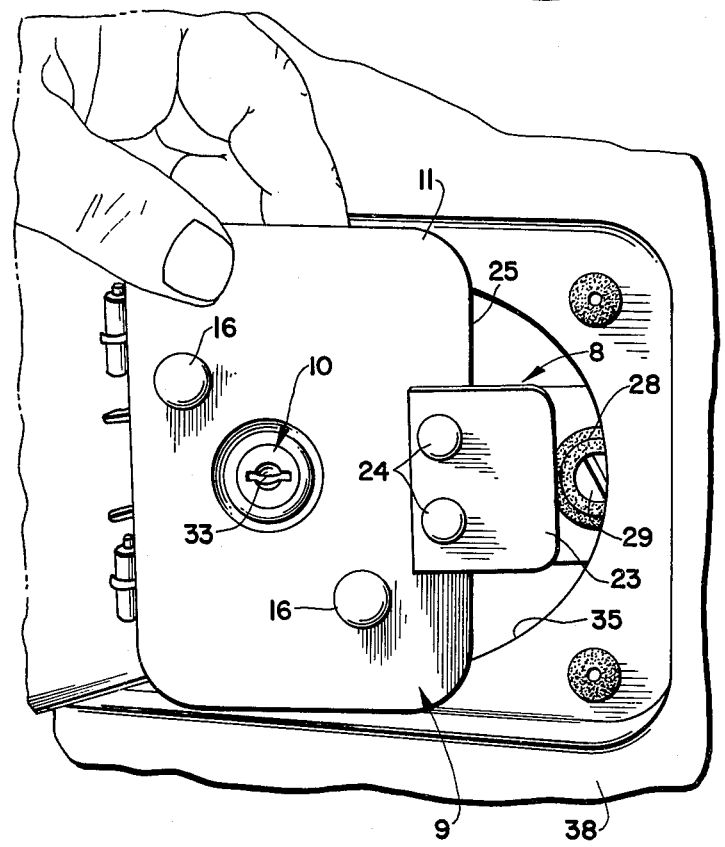
FIG. 2 is a view similar to FIG. 1 but showing the locking closure partially removed from the vehicle body opening.

A rigid ear or extension 23 is secured to the side 11 of the plate 9 by a pair of fastenings 24 which extend through said plate. The ear 23 projects beyond an edge 25 of the plate 9, as best seen in FIGS. 1 and 2.

One end of the bracket 26 is secured to the other side 12 of the plate 9 by the fastenings 24. The bracket 26 likewise projects beyond the edge 25 and has an opposite end 27 which is offset from the plane of the plate 9, in a direction away from the extension 23.

A bumper 28 formed of an elastic material, such as rubber, has a screw 29 extending therethrough. The head of the screw 29 is recessed in a socket or cavity of the bumper 28 and a nut 30, carried by the screw 29, cooperates with the screw head for clamping the bumper 28 thereto. Screw 29 is threaded outwardly through the bracket end 27 to adjustably position the bumper 28 relative to the plane of the plate 9, and is retained in different adjusted positions by a lock washer 31 and nut 32.

Figure 3:
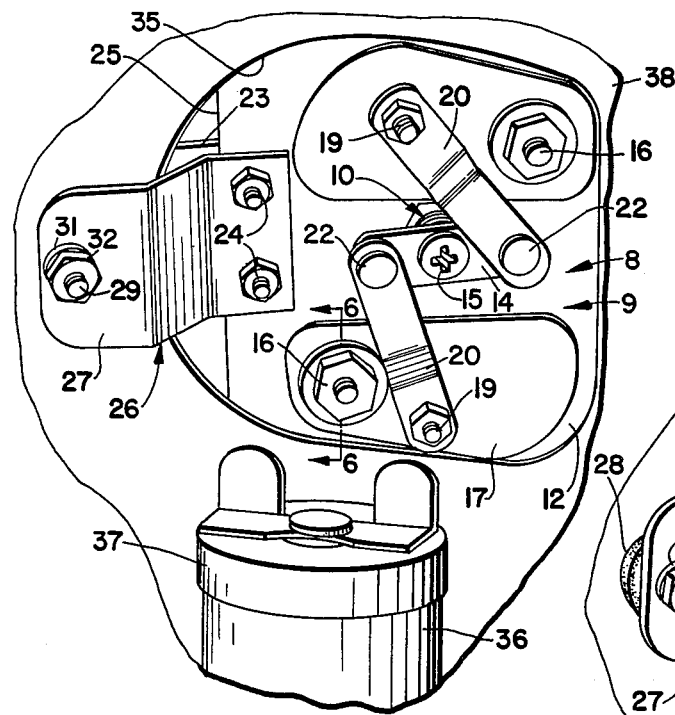
FIG. 3 is a perspective view looking toward the inner side of the body portion provided with the opening and showing the closure applied thereto but in an unlocked position.
Figure 4:
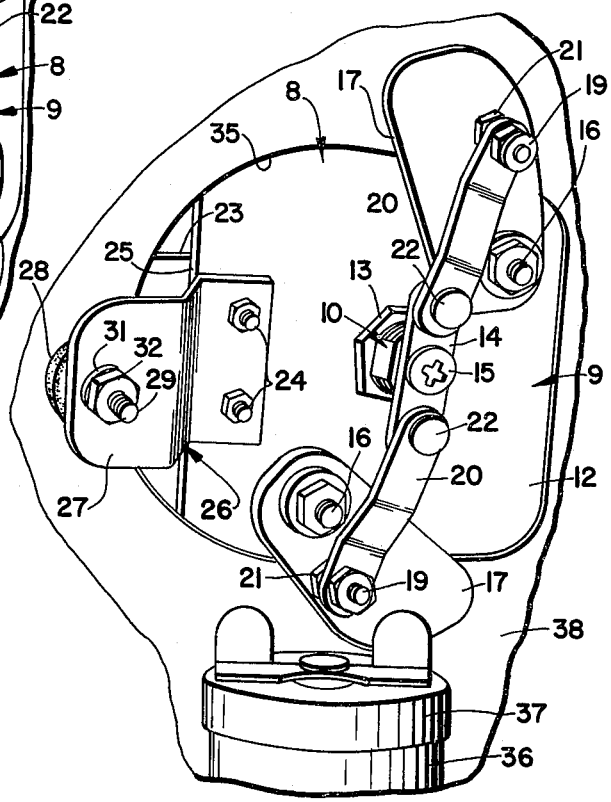
FIG. 4 is a perspective view of the parts as seen in FIG. 3, but taken from a different angle and with the closure shown in a locked position.
Figure 6:
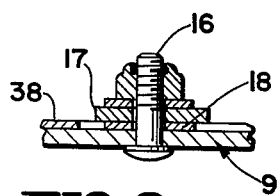
FIG. 6 is a fragmentary sectional view taken substantially along a plane as indicated by the line 6—6 of FIG. 3.
Figure 5:
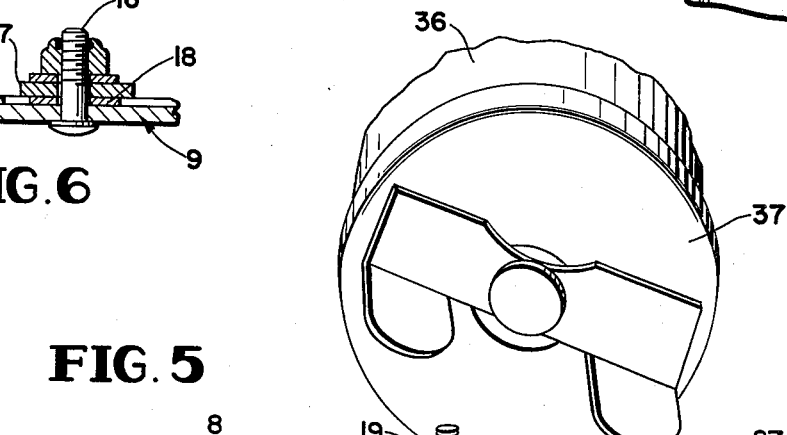
FIG. 5 is an enlarged perspective view of the parts as seen in FIG. 4 and as said parts will appear when viewed from top to bottom of FIG. 4.

The lock 10 is operated in a conventional manner by a key, not shown, which is inserted into an opening 33 for turning the lock plug and the bar 14, the ends of which function as cranks for either exerting a thrust on the two links 20, when the lugs 17 are in their retracted position, for swinging the lugs outwardly to their locking positions of FIGS. 4 and 5, or for exerting a pull on the links 20, when the key is turned in the opposite direction, for swinging the lugs 17 inwardly from their locking positions of FIGS. 4 and 5 to their unlocked positions of FIG. 3.

With the lugs 17 in their positions of FIG. 3, a hinged door 34 which normally covers an access opening 35 in a part of the body of a motor vehicle, usually a fender, is swung to an open position. The opening 35 affords access to the fuel tank filling neck 36 and the cap 37 thereof, so that with the door in an open position the cap 37 can be removed to permit the nozzle, not shown, of a fuel pump to be inserted into the neck 36 for refilling the fuel tank, as is conventional.

After the cap 37 has been replaced on the neck 36, the locking closure 8 can be applied with the locking dogs 17 in their retracted positions of FIGS. 1, 2 and 3. This is accomplished by initially moving the bracket end 27 together with the bumper 28 through the opening 35, and then moving the closure 8 from left to right of FIG. 2 until it is in its position of FIG. 1 with the extension 23 overlaying a part of the vehicle body 38 located adjacent a portion of the opening 35 and with the bumper 28 pressing against the inner side of said body portion. As seen in FIGS. 1 and 2, the plate 9 is elongated and the edge 25 constitutes one side edge thereof. The plate 9 is of sufficient length to span the opening 35 and to engage on other portions of the body 38 which surround the opening 35 and which are spaced from the part engaged by the ear 23. The key is then inserted in the opening 33 for turning the lock plug for moving the locking dogs 17 from their retracted position of FIG. 3 to their locking positions of FIGS. 4 and 5, in engagement with the inner side of the body portion 38, for cooperation with the ear 23, the end portions of the plate 9, and the bumper 28, for locking the closure 8 immovably to the body portion 38, and so as to sufficiently cover the opening 35 to render the cap 37 and neck 36 inaccessible from the exterior of the body portion 38. The bumper 28 will prevent any movement of the closure 8 when in a locked position and thus prevent any rattling. Said bumper may be adjusted, when necessary, relative to the bracket end 27 to increase the pressure exerted thereby against the body portion 38. It will be obvious that the closure 8 may be readily removed when a proper key is applied to the lock 10 for refilling of the fuel tank through the neck 36.

The closure 8, when applied, will not interfere with the closing of the hinged door 34.

Various modifications and changes are contemplated and may be resorted to, without departing from the function or scope of the invention.

I claim as my invention:

1. A locking closure for a fuel tank comprising a plate adapted to span an opening of a vehicle body normally affording access to a fuel tank filling neck, a key operated cylinder lock mounted in and extending through said plate, a pair of locking dogs, means swingably mounting said locking dogs on an inner side of the plate, crank members secured to and rotatable with a rotatable part of the lock and disposed on the inner side of said plate, rigid links connecting said crank members and locking dogs for simultaneously exerting either a thrust or pull on the locking dogs when the rotatable part of the lock is turned by a key applied to the lock from the other outer side of the plate, for moving the locking dogs between extended, locked positions against the inner side of the vehicle body or retracted unlocked positions out of engagement with the vehicle body and in sufficient close proximity to one another for passage through said opening, a bracket secured to and projecting from said inner side of the plate, a resilient bumper supported by said bracket and disposed to yieldably engage against a portion of the inner side of the body when said dogs are in locking positions, and means to adjustably position the bumper relative to the bracket for varying the pressure exerted by the bumper on said body portion.

2. A locking closure as in claim 1, said plate being elongated and having end portions engaging the outer side of the body on opposite sides of the opening, and an extension projecting from a side edge of the plate and disposed on the outer side thereof for engaging the outer side of another portion of the body.

* * * * *